May 9, 1967     F. J. CYGAN ET AL     3,318,709
PINEAPPLE PROCESSING
Filed July 1, 1963     2 Sheets-Sheet 1
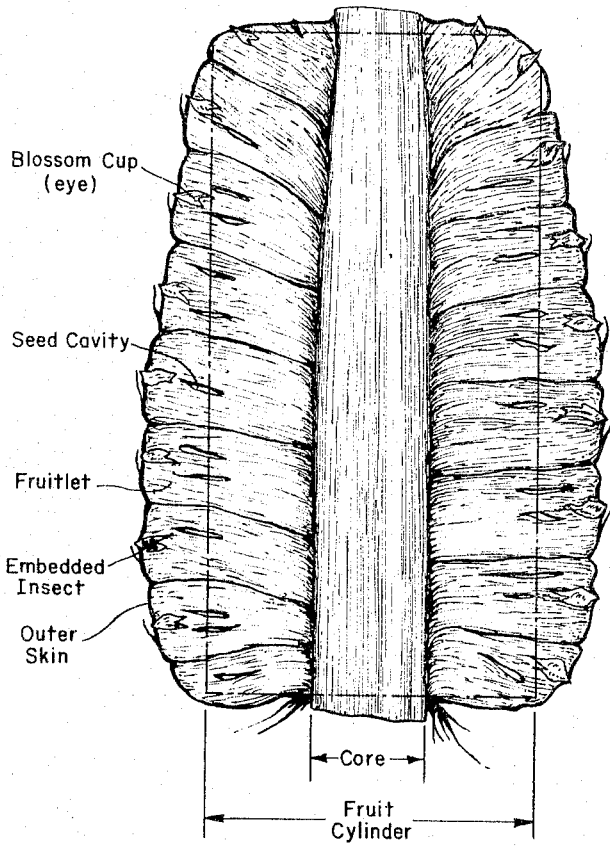
Fig. 1
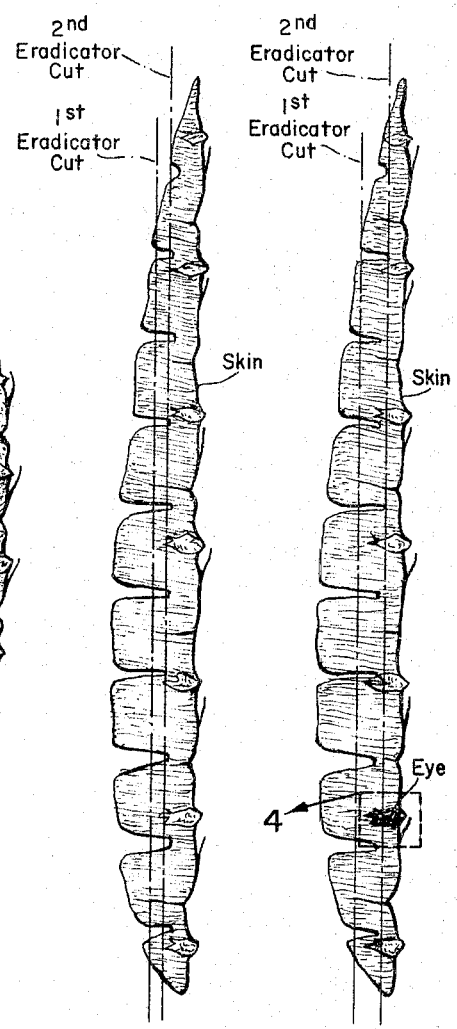
Fig. 2 (PRIOR ART)     Fig. 3 (INVENTION)
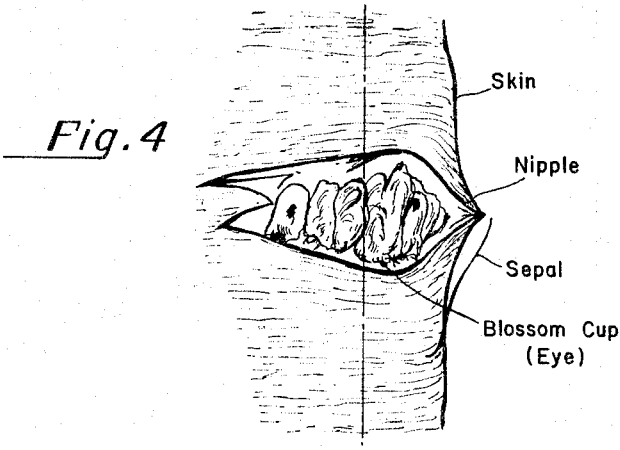
Fig. 4
INVENTORS.
FRANK J. CYGAN
JOHN FARMER
BY Dalbert Hoopes
ATTORNEY

3,318,709
PINEAPPLE PROCESSING
Frank J. Cygan, San Mateo, Calif., and John Farmer, Honolulu, Hawaii, assignors to Pennsalt Chemicals Corporation, a corporation of Pennsylvania
Filed July 1, 1963, Ser. No. 291,914
4 Claims. (Cl. 99—105)

This invention relates to the processing of pineapples. More specifically, this invention relates to the production of a pineapple juice.

The features of the invention will be apparent to those skilled in the art upon reference to the following discussion and detailed description of preferred forms of the invention, especially with reference to the drawings in which:

FIGURE 1 is a half section of a whole pineapple;

FIGURES 2 and 3 are longitudinal sections of a portion of the shell of a pineapple indicating the depths of eradicating cuts of the prior art and under the invention respectively;

FIGURE 4 is an enlarged portion of FIGURE 3; and

Figure 5:
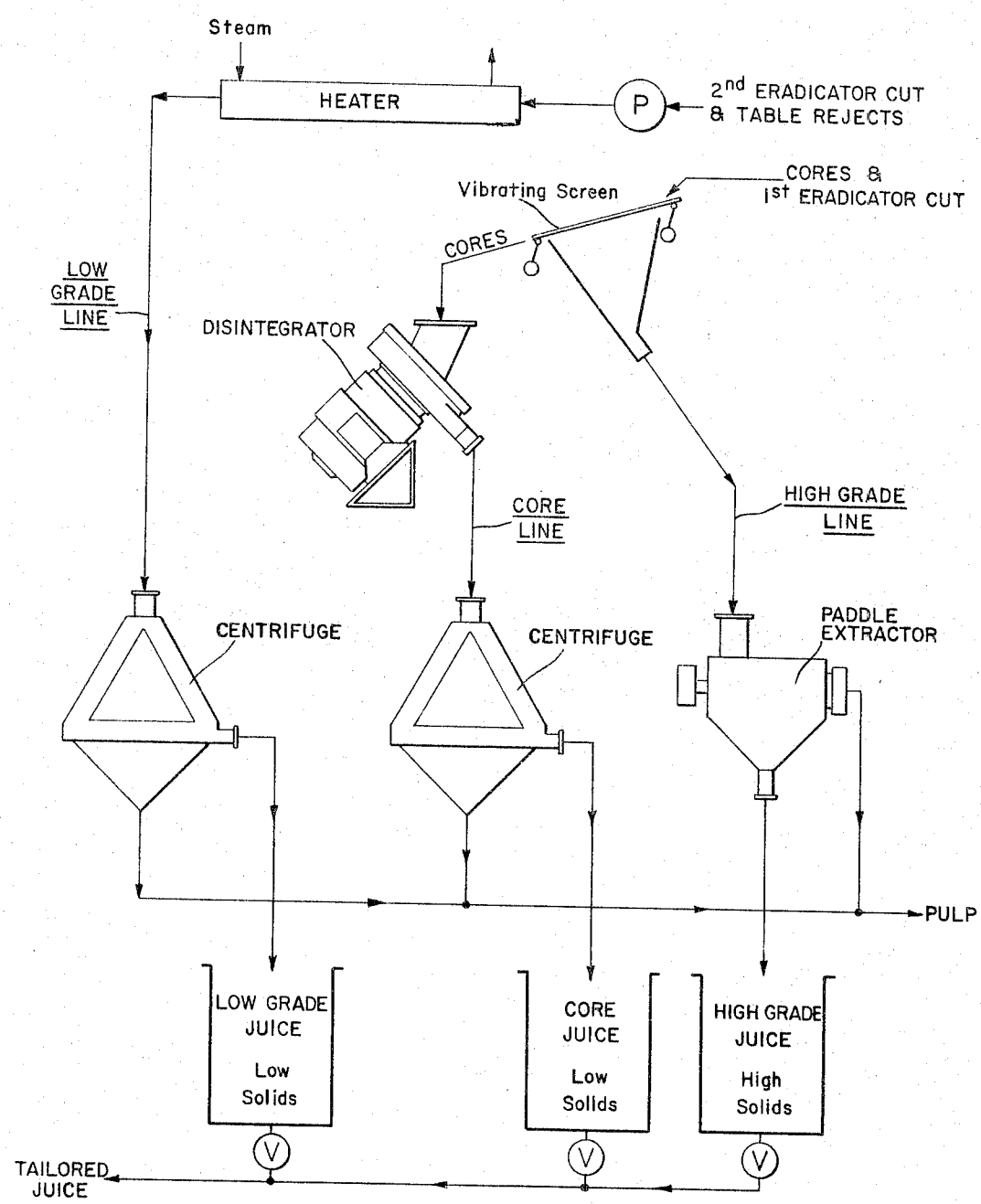
FIGURE 5 is a flow diagram illustrating schematically a preferred form of the process embodying the invention.

Referring more specifically to the drawings, the invention will best be understood after reference to the structure of a pineapple as represented in FIGURE 1. A pineapple is a multiple fruit composed of a large number of fruitlets growing from a central stem commonly called the core. Each fruitlet is a portion of a small flower which forms off the stem before the fruit matures. The flowers mature from the lower end of the fruit upward just as subsequently the fruitlets mature progressively upward. As a result the pineapple at the lower end of the fruit is usually more flavorful and contains less fiber and more sugar than the upward portions.

The part of the pineapple in the core is fibrous and woody but is clean and suitable for use in juice though its fruit quality is somewhat lower than some outer portions. Outward from the core is the fruit cylinder portion of prime pineapple meat used in cutting the familiar pineapple rings. This portion, as shown in FIGURE 1, contains some of the seed cavities or vessels, and is of soft fiber and flavorful.

As the outside of the fruitlet and its skin covering is approached from the cylinder as shown, the fruit becomes less porous and contains a greater amount of fiber which is attached to the skin. The fruit in this area is marred by the presence of the deep blossom cups or eye cavities and embedded insect carcasses but the fruit quality is excellent: it has good flavor, good color and fine texture. It also contains a high percentage of aromatics and vitamins and makes an excellent juice product.

The eye cavities (FIGURE 4) are the vestiges of the flowers and penetrate the edible meat of the fruit to a depth of, for instance, $3/8''$ to $7/16''$. The eyes are composed of hard brown parchment-like material which is tough and strong. They are shut to the outside by three sepal leaf tips which grow together to form the skin of the fruit at a pointed protrusion, commonly called a nipple.

Referring again to FIGURE 1, it has been customary in pineapple processing to feed the whole fruit into an automatic machine which cuts off both ends, cores the cylinder and trims the cylinder from the shell. An early example of such a machine is shown in Patent 1,060,250 to Ginaca. The thus treated fruit comprising the hollow fruit cylinder is appropriately sliced, canned and sold. The core has been used in the past for crushed pineapple or juice and the fruit adjacent the shell similarly has been processed into crushed pineapple or juice, usually both.

The well-known treatment for the shell is diagrammatically shown in FIGURE 2. The shell has been flattened out skin side down against a corrugated table or a cleated moving belt and a knife called an eradicator has shaved the juicy meat portion from the top of the shell for use in the crush pack. Lest the crush pack be contaminated care has been taken to avoid making this cut so deep as to include the eyes and embedded specks adjacent the skin. A thin second eradicator cut has been made for use in the juice pack and has included a portion of this contaminated zone and been carefully disintegrated. As a result the rich meat adjacent the skin which contains a high amount of valuable aromatics has not been used in quality juice. Alternatively, processors have made their second cut deeply to garner this rich meat at the expense of also including contaminants and have later very finely disintegrated the entire cut so that the objectionable specks become so small as to be not visible in the juice. This latter processing is now subject to increasing criticism in the trade as well as by governmental inspectors.

Many attempts have been made to remove the meat material from adjacent the skin and still leave the eyes in place. In one attempt the meat has been brushed from the skin by rotary brushes leaving the eyes relatively untouched. This procedure, however, proved troublesome and inefficient, partly because of the strong radial fibers which are firmly attached to the skin surface. In another attempt circular knives were attached to the sizing knife to cut the meat from the skin, and the juice close to the skin was squeezed by plastic rollers. This procedure left a large percentage of good fruit on the skin, which was lost to waste, and also squeezed undesirable flavors from the skin into the juice.

Hence it is an object of this invention to provide a pineapple juice process in which the rich outer portions of the pineapple adjacent the skin and rich in quality juice may be used to the greatest advantage and still avoid undue contamination of the juice pack with eyes, insect specks, etc.

In the prior art it has been conventional to collect all juice stock in a single hopper and to disintegrate this stock together to form a single juice pack. Unfortunately, the natural pineapple juice product has a limited market appeal and it has been difficult to sell the large amounts of single characteristic, single strength juice and concentrate that have been produced.

A further object of the invention, therefore, is to provide a process whereby the pineapple juice pack may be produced with selected characteristics thereby giving to the product the attributes desired for a given use and whereby new uses for pineapple juice may be exploited.

A still further object of the invention is to achieve greater juice yields from the pineapples processed than has been previously possible.

Other objects will be apparent.

Under the present invention for the preparation of junce two successive cuts are made by the eradicator (FIGURE 3) into the fruit. The first eradicator cut may be set to come within $1/32''$ of the top of the eyes and hence includes little or no portions of the eyes, insect specks, etc. The fruit of this cut is the best flavored in the pineapple. It is less fibrous than material near the core or the skin and contains a high proportion of soft celled fruit. It contains a portion of the carpel and septum and is composed of fully developed mature fruit parts and its structure is soft and porous and its solids after disintegration are preferred for a high quality juice.

The second cut which may be set for about $3/16''$ from the outside of the skin does contain substantial amounts of eyes, insect specks, etc. This setting is well toward the skin from the second eradicator cuts of the prior art (FIGURE 2) and this greater depth into an area extremely rich in juice represents one of the advantages of the invention. Under the invention the second eradicator cut is made at least 1/16" deeper than formerly and utilization of this additional material in the juice means higher yields of juice. For instance changing the depth of the outer cut only 1/100" from .187" to .197" has been found to increase the amount of material to the juice plant by over 5%. Under this invention it is possible to use this outer material which formerly has been eschewed because of its eye and speck contaminants. It has been found that the product of this second eradicator cut which has high fruit quality contains short radial fibers that lend little support to the fruit structure and that this fragile material may be easily broken into small pieces. Such gently breaking leaves the eyes and insect specks intact for later simple separation from the fruit, preferably by centrifuging.

Under a process embodying the invention as diagrammed in FIGURE 5, the material from the first eradicator cut along with the cylindrical cores from the Ginaca machine is delivered to a vibrating screen which may be comprised of ½" diameter rods spaced on 1¼" centers. The soft meat portions of the first eradicator meat will fall through the openings in the screen, while the cores will remain on the top of the sloping screen and move to a disintegrating device. The disintegrating device may be a Rietz disintegrator made by the Rietz Manufacturing Company of Santa Rosa, Calif. Such a machine will comprise a rotating shaft with fixed or pivoted disintegrating arms to which the fruit is introduced axially. The arms are surrounded by a screen through which the material may pass after it has been appropriately reduced in size. In a form of the invention the openings in the disintegrator screen are ¼".

The material emerges from the disintegrator as a free-flowing clean sweet juice containing small sharp free-draining fibers. This material is passed directly to a centrifuge in the preferred form of the invention. The machine preferred is of the rotary perforate frusto-conical basket type in which feed is delivered to the smaller end and the separated solids discharge from the wider end. A screw conveyor controls movement of the solids through the machine. Such a machine is available from The Sharples Corporation of Philadelphia, Pa., under the trademark "Conejector" centrifuge. For the purposes of the invention the particular machine may have screen openings of .030", .020" to .040" being the preferred range.

The solids from the centrifuge are led to the pulp line as shown and may later be pressed to recover some juice values. The liquid discharge of the centrifuge, being sweet and having low solids content is collected and conducted to a container for subsequent blending.

The soft eradicated material which passed through the vibrating screen is funneled into a paddle extractor in which a rotary paddle rotating at high speed, for instance, 40–500 r.p.m. tumbles the fruit inside a perforate cylinder breaking it up to small sizes and forces them through the perforations. This is a disintegrating action. The high solids material passing through the screen is collected and stored in a high grade juice container for subsequent use as in a blended product, while the solid discharge passes to the pulp line for pressing.

Referring again to FIGURE 5, the second eradicator cut which is juicy but contains contaminants as noted is led to a low grade processing line along with table rejects. Table rejects comprise the customary pineapple ring slices which because of being slightly over or under ripe or badly formed are unacceptable for the solid pack. It may include bits of skin, especially if it comes from the small end of the fruit and some coarse fiber. For this reason it is processed by the gentle low grade line.

In the preferred form of the invention the material for the low grade line is received by a pump, preferably one of the well-known Moyno type which gently breaks the pieces of fruit, reducing their size and fluidizing them. The action of the pump, however, is not so violent or thorough as to disintegrate the eyes or inspect parts, but is gentle breaking action. It should be noted that this action may be achieved by other means as, for instance, a pair of cooperating rollers or a mangle set to break the fruit but not disintegrate the eyes, insects, etc. However, a pump is selected since it not only breaks the fruit but also conveys it through the line.

From the pump or equivalent device the broken fruit with contaminants progresses to a heat exchanger. This may be in the form of a steam jacketed pipe. The exchange walls are heated by the steam to raise the temperature of the fruit to about 170° F., at least 160°, to break the cell walls and release the juice from the fruit. It will be understood that the material in the line is a slurry so that it is easily moved on.

Subsequent to the heater the solids are separated from the liquid. This is preferably accomplished by a centrifuge of the same type as is used in the line for disintegrated fruit. Because they have not been disintegrated, the eyes and insect specks are easily removed. In the low grade line, however, to assure that the eyes and insect carcasses are not part of the liquid discharge, the openings of the centrifuge basket are preferably smaller than in the core line. The openings may be in the range .015" to .030", .020" being most preferred. The liquid discharge from the machine is largely liquid with low solids. This liquid discharge is led to a container as shown for subsequent blending or other use. The solids discharge or pulp may be joined with the other solids discharges for additional extraction as in a press.

From FIGURE 5 it will be noted that the liquid discharges from the various separating devices are collected separately. Each is characterized by individual and separate characteristics of taste, solids content, brix-acid content, etc. From the respective containers the liquid discharges may be blended as desired to constitute a juice product of characteristics best for the selected end use. This is one of the major advantages of the process of the invention, as it has long been known that to mix all juice materials together to produce a single grade of standard juice drastically limits the sales possibilities of the product.

Under the invention juice products are tailored with the particular end use in mind. For instance, a single strength juice can be prepared by blending the products of the three juice lines and the blending can be carefully controlled to achieve the desired 17 to 24% solids content and the desired flavor, for instance, drawing more from the high grade juice or low grade juice line to increase or decrease solids content. For frozen concentrate, juice can be tailored from the products of the high grade juice line and the core line to give the most satisfactory combination of solids and brix-acid content. For blending with other fruit juices the low grade line juice with strong flavor is selected as the heavy proportion of the blend. For fancy syrups the product of the core line (low in solids and high in sugar) after passing through an evaporator to increase the sugar concentration is found highly desirable as the predominate part. The high grade line comprising the first eradicator cut material of highest quality and purity is ideally suitable for baby foods. On the other hand, for a pineapple nectar material the low grade line with some eradicator meat containing some amounts of skin for flavor is ideally suitable.

It should be understood that variations of the process are possible. For instance, if for the ultimate products there is no need to keep them segregated, the first cut eradicator meat may be combined with the cores and disintegrated in the core line. This makes the vibrating screen and paddle extractor unnecessary, and the process will feature only two sources of juice from which to blend the product. Such a modification will enjoy many of the benefits of the invention, however, since its product will be in high yield and be free of the eyes and insect carcasses which have contaminated prior products.

Those skilled in the art will understand from the above description that the present invention offers many advantages in making pineapple juice. First, the outer portions of the pineapple are used to the benefit of yield and flavor without contamination of the juice by eyes and insect carcasses which are normally present in such portions. Second, new flexibility in final product is achieved by processing separately the various parts of the pineapple and collecting the discharges in separate containers for subsequent tailoring of the ultimate product as desired. Third, by use of more of the pineapple, much greater volume is achieved in the resulting juice pack.

While we have explained our invention with the aid of particular embodiments thereof, it is to be understood that we do not wish to be limited to the specific structural details illustrated and described from which departure can be made without departing from the spirit and scope of the invention as defined by the following claims.

We claim:

1. A process for preparing pineapple juice comprising the steps of removing a central fruit cylinder from the pineapple, slitting the remaining pineapple longitudinally thereby opening the pineapple, and placing the opened pineapple skin down on a flat surface, removing a first flat layer of meat containing few if any blossom cups and insect carcasses, removing a second flat layer of meat closer to the skin of the pineapple than the first layer, the second layer containing at least one impurity taken from the group of impurities consisting of blossom cups and insect carcasses, screening the first layer material to produce a liquid discharge which passes through the screen, gently breaking the second layer material and heating it to release juice but at the same time avoiding breakage of the impurity, centrifugally screen the thus-treated second layer material and blending the second layer material which passes through the centrifugal screen and the liquid discharge from the first layer material to produce the product juice.

2. A process as described in claim 1, wherein the second layer material is heated to a temperature of at least 160° F.

3. A process as described in claim 1 wherein the openings through which the first layer material is screened are larger than the openings through which the second layer material is screened.

4. A process as described in claim 1 wherein the first layer material is disintegrated before screening.

References Cited by the Examiner

UNITED STATES PATENTS 1,214,598   2/1917   Shaffner _____ 99—204
2,696,440   12/1954  Ball _____ 99—105

A. LOUIS MONACELL, *Primary Examiner.*

RAYMOND N. JONES, M. VOET, *Assistant Examiners.*

UNITED STATES PATENT OFFICE
CERTIFICATE OF CORRECTION

Patent No. 3,318,709　　　　　　　　　　　　　　　　May 9, 1967

Frank J. Cygan et al.

It is hereby certified that error appears in the above numbered patent requiring correction and that the said Letters Patent should read as corrected below.

Column 2, line 57, for "junce" read -- juice --; column 3, line 58, for "40" read -- 400 --; column 6, line 8, for "screen" read -- screening --.

Signed and sealed this 28th day of November 1967.

(SEAL)
Attest:

Edward M. Fletcher, Jr.
Attesting Officer

EDWARD J. BRENNER
Commissioner of Patents